United States Patent
Goetz et al.

[11] Patent Number: 6,097,183
[45] Date of Patent: Aug. 1, 2000

[54] POSITION DETECTION APPARATUS WITH CORRECTION FOR NON-LINEAR SENSOR REGIONS

[75] Inventors: Jay R. Goetz, Deephaven; Michael L. Rhodes, Richfield, both of Minn.

[73] Assignee: Honeywell International Inc., Minneapolis, Minn.

[21] Appl. No.: 09/059,798

[22] Filed: Apr. 14, 1998

[51] Int. Cl.[7] .......................... G01B 7/00; G01R 33/025
[52] U.S. Cl. .................. 324/207.12; 2072/207.21; 2072/207.24; 2072/207.25
[58] Field of Search .................. 324/207.2–207.26, 324/225

[56] References Cited

U.S. PATENT DOCUMENTS

| | | | |
|---|---|---|---|
| 2,805,677 | 9/1957 | Baird | 324/207.18 |
| 4,088,946 | 5/1978 | Charles et al. | 324/220 |
| 4,119,911 | 10/1978 | Johnson, Jr. | 324/207.21 |
| 4,262,287 | 4/1981 | McLoughlin et al. | 340/606 |
| 4,308,530 | 12/1981 | Kip et al. | 340/572 |
| 4,361,805 | 11/1982 | Narimatsu et al. | 324/207.21 |
| 4,481,469 | 11/1984 | Hauler et al. | 324/174 |
| 4,490,674 | 12/1984 | Ito | 324/207.25 |
| 4,551,676 | 11/1985 | Amemiya et al. | 324/207.21 |
| 4,589,038 | 5/1986 | Radtke | 360/79 |
| 4,592,249 | 6/1986 | Lehmann et al. | 74/473 R |
| 4,652,821 | 3/1987 | Kreft | 324/207.23 |
| 4,673,876 | 6/1987 | Paulsen | 324/207.21 |
| 4,698,996 | 10/1987 | Kreft et al. | 73/1 J |
| 4,712,064 | 12/1987 | Eckardt et al. | 324/207.21 |
| 4,725,776 | 2/1988 | Onodera et al. | 324/207.21 |
| 4,733,177 | 3/1988 | Pawletko | 324/207.21 |
| 4,791,365 | 12/1988 | Johannes et al. | 324/207.25 |
| 4,810,965 | 3/1989 | Fujiwara et al. | 324/207.22 |
| 4,818,939 | 4/1989 | Takahashi et al. | 324/207.21 |
| 4,922,197 | 5/1990 | Juds et al. | 324/207.21 |
| 4,924,696 | 5/1990 | Schroeder et al. | 73/118.1 |
| 4,992,733 | 2/1991 | Griebeler | 324/207.21 |
| 5,021,736 | 6/1991 | Gonsalves et al. | 324/202 |
| 5,038,130 | 8/1991 | Eck et al. | 338/32 R |
| 5,043,660 | 8/1991 | Hasegawa | 324/207.12 |
| 5,055,781 | 10/1991 | Sakakibara et al. | 324/207.21 |
| 5,055,786 | 10/1991 | Wakatsuki et al. | 324/252 |
| 5,196,821 | 3/1993 | Partin et al. | 338/32 R |
| 5,210,493 | 5/1993 | Schroeder et al. | 324/252 |
| 5,216,363 | 6/1993 | Masaaki | 324/207.21 |
| 5,243,279 | 9/1993 | Bajat et al. | 324/207.21 |
| 5,250,925 | 10/1993 | Shinkle | 338/32 R |
| 5,270,645 | 12/1993 | Wheeler et al. | 324/207.12 |
| 5,289,122 | 2/1994 | Shigeno | 324/252 |
| 5,291,133 | 3/1994 | Gokhale et al. | 324/207.25 |
| 5,315,244 | 5/1994 | Griebeler | 324/207.21 |
| 5,315,245 | 5/1994 | Schroeder et al. | 324/207.21 |
| 5,325,056 | 6/1994 | Shonowaki et al. | 324/207.21 |
| 5,351,003 | 9/1994 | Bauer et al. | 324/207.12 |
| 5,351,028 | 9/1994 | Krahn | 338/32 R |
| 5,386,642 | 2/1995 | Spies et al. | 33/708 |
| 5,412,317 | 5/1995 | Kyoizumi | 324/207.14 |
| 5,418,455 | 5/1995 | Takaishi et al. | 324/207.21 |

(List continued on next page.)

FOREIGN PATENT DOCUMENTS 0 027 308 A1  4/1981  European Pat. Off. .

*Primary Examiner*—Jay Patidar
*Attorney, Agent, or Firm*—Kris T. Fredrick

[57] ABSTRACT

A position determining apparatus including a magnet that is attached to a movable member which moves along a predefined path of finite length. An array of magnetic field transducers are located adjacent to the predefined path. The transducers provide a bipolar output signal as the magnet approaches, passes and moves away from each transducer. A correction mechanism is provided to correct for residual error caused by the non-linearity of the transducers. The correction mechanism preferably approximates the residual error with a predetermined function, and applies correction factors that correspond to the predetermined function to offset the residual error. By correcting for the non-linearity of the transducers, the length of the magnet may be reduced and/or the spacing of the transducers may be reduced.

36 Claims, 10 Drawing Sheets

U.S. PATENT DOCUMENTS

| | | | |
|---|---|---|---|
| 5,453,684 | 9/1995 | Nakayama | 324/207.12 |
| 5,469,055 | 11/1995 | Mueller et al. | 324/207.21 |
| 5,471,736 | 12/1995 | Griebeler | 29/609 |
| 5,488,294 | 1/1996 | Liddell et al. | 324/207.21 |
| 5,500,589 | 3/1996 | Sumcad | 324/202 |
| 5,502,380 | 3/1996 | Sittler et al. | 324/207.21 |
| 5,508,611 | 4/1996 | Schroeder et al. | 324/252 |
| 5,544,000 | 8/1996 | Suzuki et al. | 361/139 |
| 5,559,433 | 9/1996 | Onizuka | 324/207.21 |
| 5,589,769 | 12/1996 | Krahn | 324/207.26 |

POSITION DETECTION APPARATUS WITH CORRECTION FOR NON-LINEAR SENSOR REGIONS

BACKGROUND OF THE INVENTION

The present invention generally relates to position detection apparatus, and more particularly to apparatus for determining the position of a member that is movable along a defined path of finite length.

It is often desirably to identify the position of a device that is controlled by an actuator or the like. For example, in the controls industry, devices such as valves having a valve stem or valve shaft that is movable by an actuator are used to control the flow of liquids and gases associated with industrial processes of various types. In these applications, it is often desirable to identify, at any given time, the precise position of the movable valve stem or valve shaft. This information allows improved understanding of the process and the control of the process.

A number of prior solutions have been proposed. Optical coding schemes make use of a coded element with opaque and transparent sections to provide digital data inputs to an array of sensors positioned to measure the light passing through the sections. While optical coding devices do not require a mechanical linkage, the optical approach only works well in very clean environments and is therefore not applied in many industrial environments. Linear variable differential transformers (lvdt) can provide very accurate position information, but typically require a mechanical linkage and also generally use relatively high power. Potentiometers or other rotary transducers require a mechanical linkage and also have the disadvantage of a sliding electrical contact which can cause long term reliability issues. Hall effect transducers, as they are currently used, generally require a mechanical linkage.

An improved approach for determining the position of a movable member is disclosed in U.S. Pat. No. 4,698,996 to Kreft et al. Kreft et al. suggest providing a bar magnet on the movable member, which then moves parallel to a plurality of spaced sensors. During a calibration procedure, the bar magnet is moved step-by-step in a direction parallel to the line of sensors in precisely defined length units. When an output voltage of a particular sensor is zero, while neighboring sensors on either side thereof have respective positive and negative values, a length value is assigned to the particular sensor and stored.

For unknown positions of the magnet, the voltage values of neighboring sensors that are influenced by the magnet are measured and the relationships thereof are determined. Adjacent sensors that have voltage values that are of different polarity are selected. For voltage relationships which correspond exactly to a calibrated voltage relationship, the corresponding calibrated positional value is assigned to the unknown position. For voltage relationships lying between the calibration values, suitable interpolation methods are used to define the position of the magnet.

A limitation of Kreft et al. is that no compensation is provided for the nonlinearity of the sensor output signals, or the non-linearity in the magnetic field due to imperfections in the magnet or the like. Kreft et al. recognize that the sensor output signals may be non-linear, particularly when a pole of the magnet approaches the sensor. Thus, to ensure that the neighboring sensors operate in the linear region, Kreft et al. suggest using a long magnet relative to the spacing of the sensors so that the poles of the magnet are sufficiently displaced from both neighboring sensors. This, however, can significantly increase the cost of the position determining device.

Therefore, a need exists for a position determining apparatus that does not require a long magnet and/or small sensor spacing, while still reliably and accurately determining the position of the magnet.

SUMMARY OF THE INVENTION

The present invention solves these and other needs by providing a position determining apparatus that does not require a relatively long magnet and/or small sensor spacing. This is preferably achieved by providing a correction mechanism to correct for residual error cause by the non-linearity of the sensors. The correction mechanism preferably approximates the residual error with a predetermined function, and applies selected correction factors that correspond to the predetermined function to offset the residual error.

In an illustrative embodiment of the present invention, a magnet is attached to a movable member which moves along a predefined path of finite length. An array of magnetic field transducers are located adjacent to the predefined path. The transducers provide a bipolar output signal as the magnet approaches, passes and moves away from each transducer. To determine the position of the magnet, and thus the movable member, the transducers are electronically scanned and data is selected from a group of transducers having an output that indicates relative proximity to the magnet.

A ratio is calculated by dividing the amplitudes of the output signal values of the selected transducers in a predetermined way. The position of the magnet is then determined by applying a correction factor to the ratio. Preferably, the correction factor at least partially corrects for the non-linearity of the transducers.

To calculate the ratio, two adjacent transducers are preferably selected with the first transducer having a positive output signal value "A", and the second transducer having a negative output signal value "B" (though these can be reversed). By using the output signal values A and B, a ratio may be calculated that is related to the position of the magnet relative to the first and second transducers, as described above.

In a first embodiment, the ratio is defined as $A/(A-B)$. By including the term $(A-B)$ in the denominator, common mode gain variations may be reduced. In another illustrative embodiment, the ratio is defined as $[(A+B)/2]/(A-B)$. By including the term $[(A+B)/2]$ in the numerator, differential variations in the gain or sensor offset are averaged and thus potentially reduced, and common mode sensor offset variations are nulled. Although this example only includes two sensor signals A and B, it is contemplated that more than two sensor output signals may be used in this algorithm (e.g. A, B, C, D, . . . )

Because of the non-linearity of most magnetic fields and the limited linear range of most transducers, the above ratios typically have a residual error therein. For most transducers, the residual error resembles a function such as a sinusoidal function, a nth order function (where $n \geq 1$), or some other function. Accordingly, it is contemplated that the residual error may be approximated using one of these functions. The appropriate function can be determined during a calibration procedure. Once the appropriate function is identified, the residual error may be removed from the ratio by simply adding or subtracting the value of the function that corresponds to the ratio value.

In a preferred embodiment, the function approximating the residual error is divided into a number of segments. A correction factor, which corresponds to the amplitude of the function, is assigned to each segment,. Each of the correction factors are stored, preferably in a look-up table. The ratio value may then be used to identify the corresponding correction factor from the look-up table. The selected correction factor is then applied to the ratio, and the position of the magnet is calculated from the result. In this configuration, as the magnet is moved longitudinally relative to the first and second transducers, the desired ratio of signals A and B changes, and the corresponding correction factor changes, resulting in a continually updated position of the magnet.

To identify the overall position of the magnet relative to the predefined path, it is contemplated that a number of offset values may be provided. A different offset value is preferably added to the ratio of each transducer pair. For example, if there are six transducers spaced along a predefined path of length L, there are five transducer pairs, and the offset value may be $C*(L/5)*n$, where C is a constant and n identifies the transducer pair position (1 . . . 5). Thus, depending on the position of the magnet along the length of the path relative to the transducer pairs, the appropriate offset value is selected and applied. The offset preferably provides a uniformly increasing or decreasing output signal that is related to the position of the magnet along the predefined path.

The present invention also contemplates a method for determining a position of a member movable along a defined path. The method preferably includes the steps of: providing field producing means attached to the member for producing a magnetic field; providing an array of magnetic field transducers located adjacent said defined path at known locations, wherein each transducer provides a bipolar output signal as said field producing means approaches, passes and moves away from each transducer, and wherein each of said transducers providing an output signal value for a first position of said field producing means; calculating a ratio using the output signal values of selected transducers; and applying a selected correction factor to the ratio to determine the first position.

DETAILED DESCRIPTION OF THE INVENTION

Figure 1:
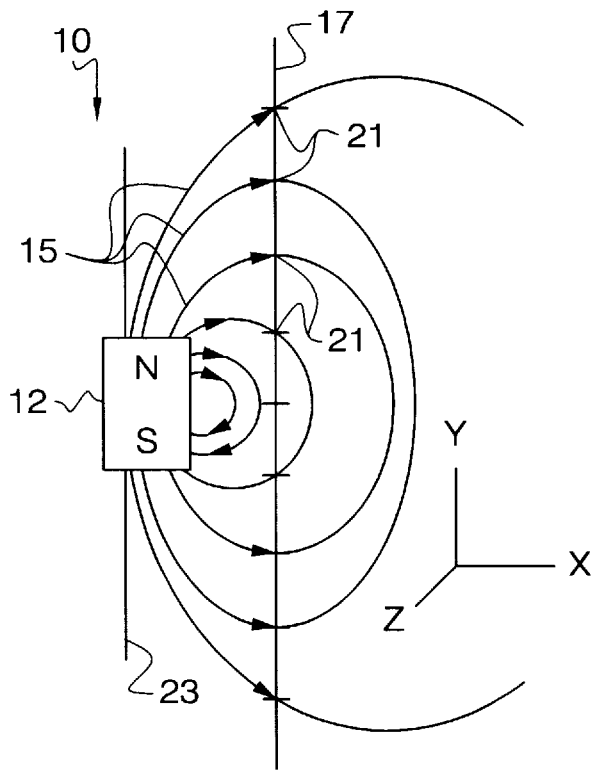
FIG. 1 is a schematic view of a moveable member having a magnet oriented parallel therewith, and a number of adjacent transducers.

An apparatus for detecting the position of a movable member such as a valve stem is shown in the drawings and generally designated 10. FIG. 1 shows an enlarged view of magnet 12 and its magnetic flux lines 15. Transducers 22 (see also FIG. 6A) are located along line 17, for example, at locations 21. Magnet 12 moves along line or path 23. In this embodiment, the magnet poles are oriented parallel to the line or path 23 of magnet 23.

Transducers 22 may be designed to be sensitive to a magnetic field component in a particular direction, for example, along the x, y or z axis of FIG. 1. One example of this type of sensor is a Hall sensor arranged to be sensitive along the x-axis. Alternatively, transducers 22 may be designed to be sensitive to a combination of components. One example of this type of sensor is a transducer of magnetoresistive material, e.g., permalloy strips connected in a bridge arrangement, lying in the x-y plane and operating in a field strong enough to saturate the permalloy strips. Under these conditions, the resistance change of the permalloy strips is a measure of the angle of the magnetization in the x-y plane and therefore a measure of the angle of the magnetic field. Example magnetoresistive transducers include HMC1001, HMC1002, or HMC1501, all available from the assignee of the present invention.

Figure 2:
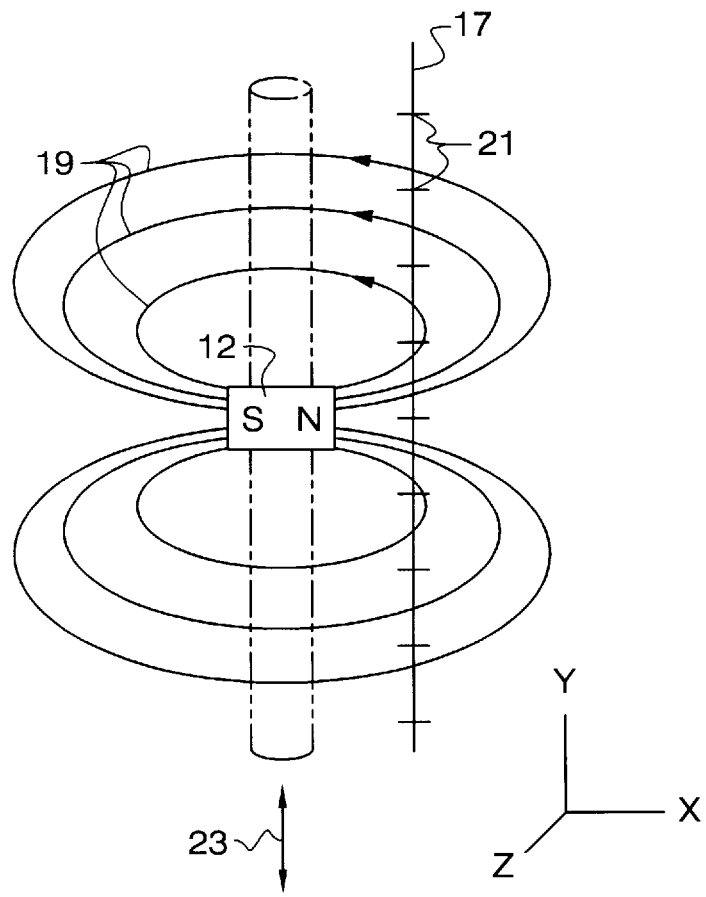
FIG. 2 is a schematic view of a moveable member having a magnet oriented perpendicular thereto, and a number of adjacent transducers.

FIG. 2 shows another illustrative embodiment having the poles of the magnet 12 oriented perpendicular to line or path 23. Accordingly, the magnetic flux lines 19 of this embodiment are offset by 90 degrees from the flux lines 15 of FIG. 1. For both of the embodiments shown in FIG. 1 and FIG. 2, the transducers 22 preferably measure the angle of the magnetic field at the locations 21.

Figure 3:
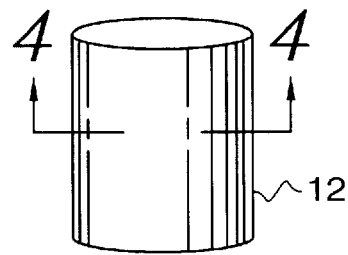
FIG. 3 is a side view of a cylindrically shaped magnet.
Figure 4:
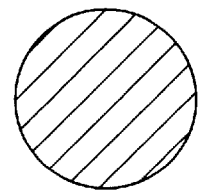
FIG. 4 is a first cross-sectional view of the magnet of FIG. 3, taken along line 4—4.

FIG. 3 is a side view of a cylindrically shaped magnet. The cylindrically shaped magnet 12 is preferably mounted on the movable member, such as a valve stem 14 (see FIG. 6A). FIG. 4 is a first cross-sectional view of the magnet of FIG. 3, taken along line 4—4, showing a sold cross section. A limitation of a magnet having a solid cross-section is that it can be difficult to achieve a high degree of magnetization.

One reasons for this is that it is difficult to apply a strong magnetic field to the inner material of the magnet.

Figure 5:
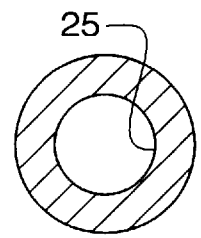
FIG. 5 is a second cross-sectional view of another embodiment of the magnet of FIG. 3, taken along line 4—4.

To increase the flux that can be applied to the inner material of the magnet, it is contemplated that a bore 25 may be provided through the magnet 12, as shown in FIG. 5. A magnetic field producing device such as a coil may be inserted through the bore 25 during the magnetization of the magnet. This may substantially decrease the difficulty and increase the degree of magnetization of the magnet. To use the magnet of FIG. 5, it is contemplated that the bore 25 may receive the moveable member. In this configuration, the magnet 12 is positioned circumferentially around at least part of the outside surface of the moveable member 14.

Figure 6A:
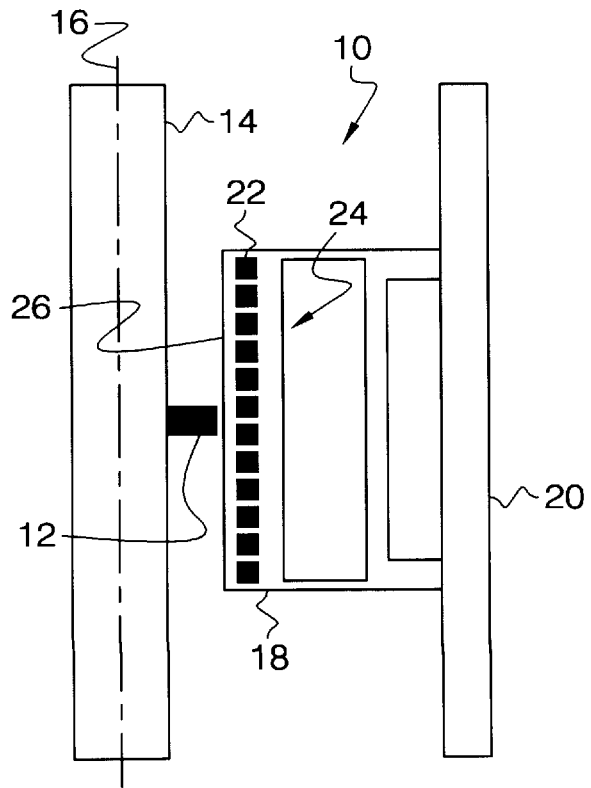
FIG. 6A is a side view of a preferred embodiment of the present invention, along with a portion of a valve stem and a valve yoke.

FIG. 6A is a side view of a preferred embodiment of the present invention. The position determining apparatus 10 includes a magnet 12 which is attached to valve stem 14 which is in turn attached to other movable valve parts (not shown) that vary the flow through the valve. Valve stem 14 is movable along its longitudinal axis 16. Apparatus 10 also includes a sensor module or electronics module 18 which is mounted to valve yoke 20 or another suitable fixed support located beside valve stem 14. Sensor module 18 includes magnetic field transducers 22 arranged in a linear array 24 parallel to longitudinal axis 16 with transducers 22 spaced a known distance 26 apart.

Magnet 12 moves as valve stem 14 moves, and the magnetic field from magnet 12 also moves along array 24. Magnet 12 provides a magnetic field that can be represented by components along three mutually perpendicular axis. As indicated above, transducers 22 may be designed to be sensitive to a magnetic field component in a single direction, e.g., along the x-axis, or to be sensitive to magnetic field components in a combination of directions. Each transducer 22 obtains magnetic field data when magnet 12 is in proximity to it.

Figure 6B:
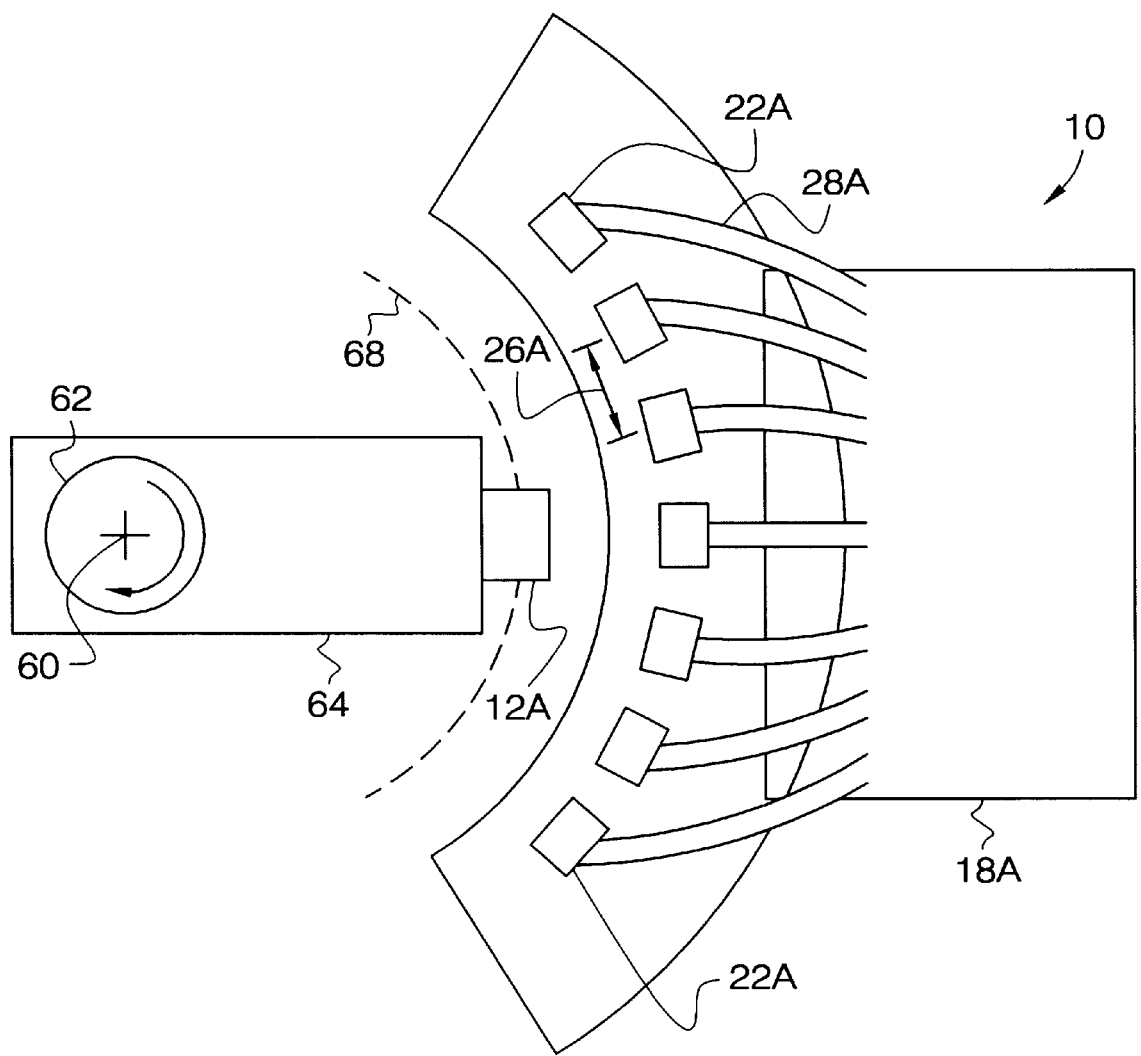
FIG. 6B is a schematic diagram showing yet another preferred embodiment of the present invention, along with a portion of a rotating valve shaft and an attached arm.

FIG. 6B shows an arrangement of detection apparatus 10 for use with a device wherein the required movement is in a curved path. One example of this type of application is a valve designed for control by rotational movement about an axis 60 of a shaft 62. A crank arm 64 is secured to shaft 62 and movement of end 66 of crankarm 64 controls flow through the valve. Transducers 22a are connected to electronics module 18a which is maintained to a fixed support. In this arrangement, magnetoresistive transducers 22a are placed in a curved path representing a portion of a circular path about shaft 62. In other respects, the operation of apparatus 10 illustrated in FIG. 6B is similar to the arrangement shown in FIG. 6A.

Figure 7:
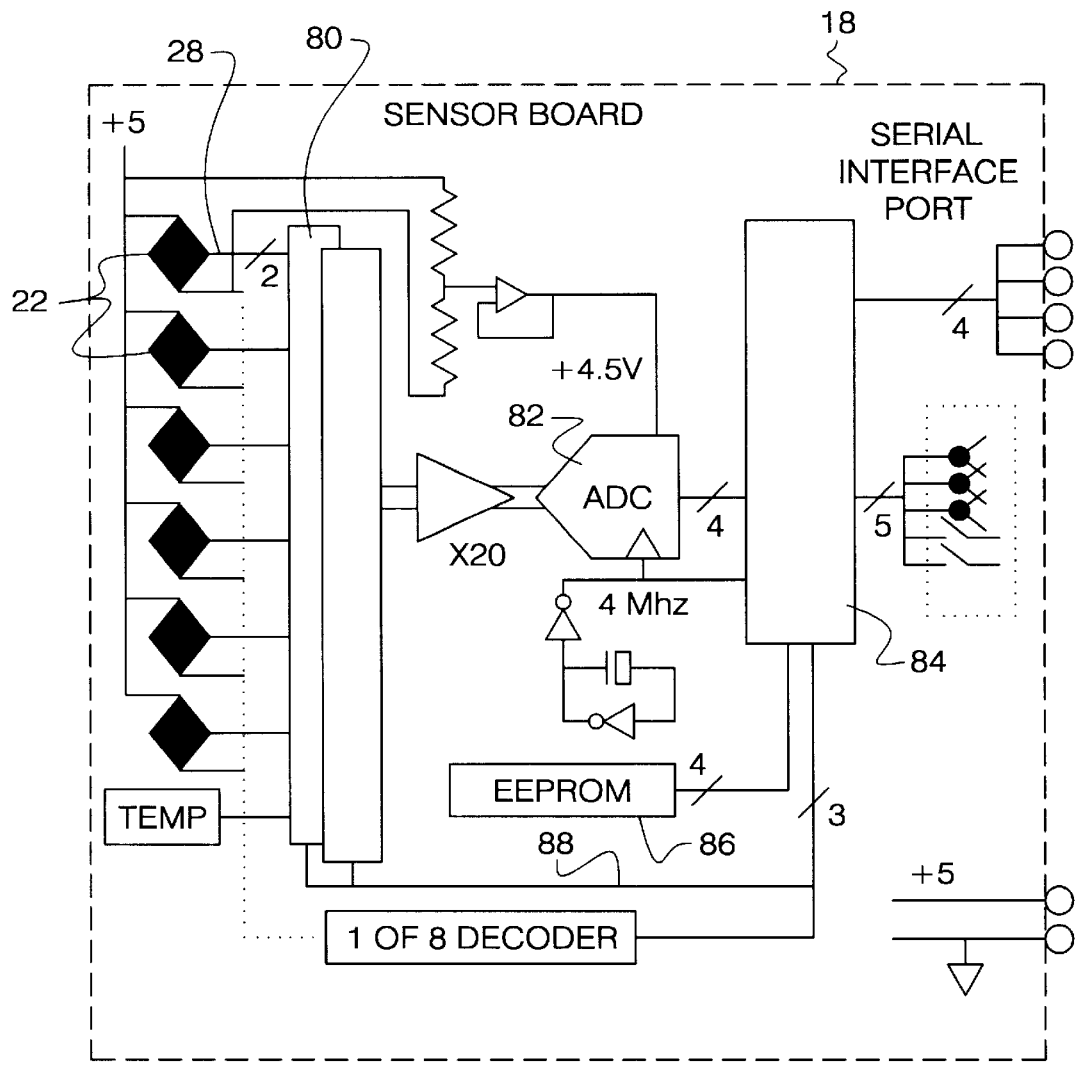
FIG. 7 is a block diagram of the sensor module of FIG. 6A.

FIG. 7 is a block diagram of the sensor module 18 of FIG. 6A. Transducers 22 are connected to sensor module 18 by conductors 28. Magnetic field data from transducers 22 may be obtained in series or in parallel. To minimize power consumption, transducers 22 may be wired to multiplexer 80 to obtain data serially as shown. FIG. 7 also shows analog-to-digital converter (A/D) 82, microprocessor 84 and its associated memory 86. Microprocessor 84 control which transducer 22 is connected to analog-to-digital converter 82 via control lines 88. To obtain data in a shorter time, transducers 22 may be connected to individual A/D converters which are in turn individually connected to a microprocessor 84.

Microprocessor 84 is preferably a lower-power and lower performance processor such as a Motorola 68HCO5 or a Microchip PIC16C71, which is suitably programmed to use an algorithm to select appropriate output signals provided by transducers 22, compute a ratio, select and add an appropriate correction factor to the ratio, and provide a signal or count indicative of the position of the magnet along the predefined path. An algorithm can be embedded in microprocessor 84 for this purpose. Microprocessor 84 is preferably suitably programmed to provide functions that include the following: periodically scan the outputs of each transducer to obtain data; selecting two or more transducers having an output that indicates relative proximity to the magnet; calculating a ratio of the output signals of selected transducers; selecting and applying an appropriate correction factor; and adding an appropriate offset value to obtain the position of the magnet.

Figure 8:
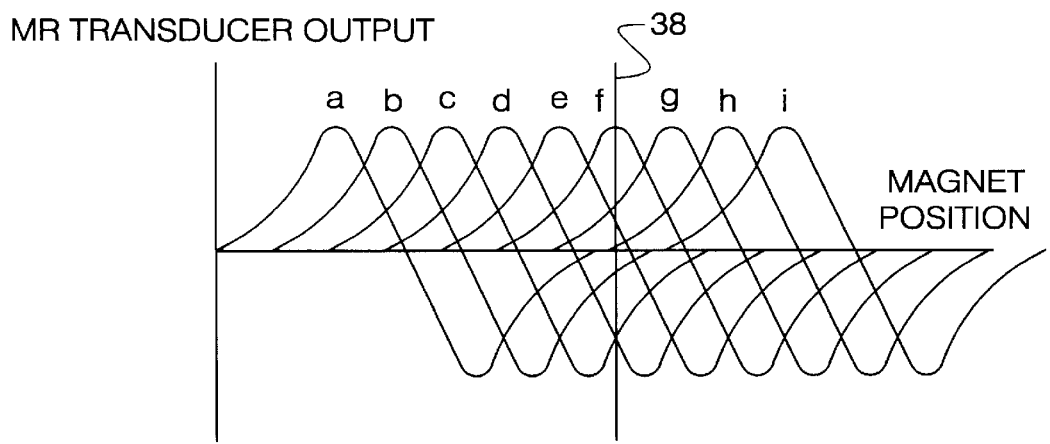
FIG. 8 shows a number of curves representing the output signals from selected transducers of FIG. 7.

FIG. 8 shows magnetic field data representative of the output of each transducer 22 for an array of 9 (nine) transducers as a function of the position of a dipole magnet 12. A varying output signal is provided by each transducer 22 as the magnet 12 approaches, passes and moves away therefrom. The output signals are designated a through i. Vertical line 38 represents the position of magnet 12. As the magnet 12 moves and one of its poles approaches a transducer, a linear rise or, respectively, drop, of its output signal voltage occurs. Depending upon the strength of the magnetic field generated by the magnet, and the distance of the magnet from the transducer, the linear curve becomes nonlinear until a maximum output voltage is reached, after which the output voltage falls off.

To always operate in the linear region, the transducer spacing must be relatively small compared to the length of the magnet. That is, to ensure that the neighboring transducers operate in the linear region, the poles of the magnet must be sufficiently displaced from both neighboring transducers. This, however, can significantly increase the cost of the position determining device. Further, is often difficult to maintain the transducers in the linear region under all operating conditions. In view thereof, the present invention contemplates correcting for the non-linearity's in the transducer outputs by applying a correction factor, as more fully described below.

Figure 9A:
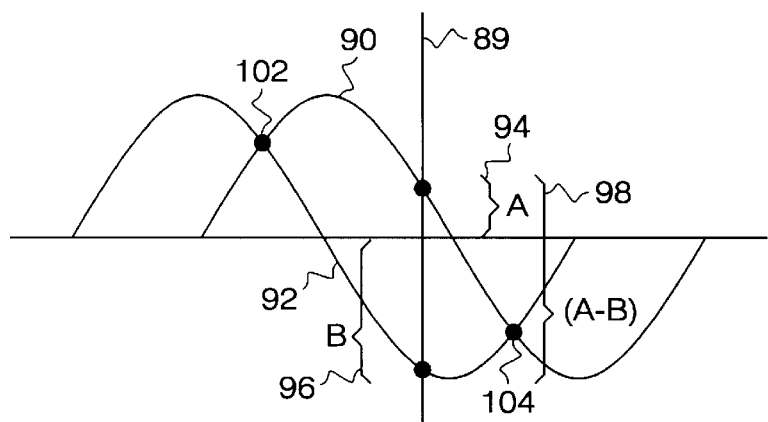
FIG. 9A shows illustrative output signals from two neighboring transducers of FIG. 7.

FIG. 9A shows illustrative output signals 90 and 92 of a first and second transducer. Vertical line 89 represents the position of magnet 12. At vertical line 89, the first transducer that has a positive output signal value "A" 94, and the second transducer that has a negative output signal value "B" 96. This relationship between signals A and B indicates that the position of the magnet 12 is somewhere between the first transducer and the second transducer. To determine the position of the magnet 12 relative to the first and second transducers, a ratio is calculated by dividing the amplitudes of the output signal values 94 and 96 of the first and second transducers in a predetermined manner. After applying a correction factor to the ratio, the position of the magnet may be determined by interpolating to a location between the first and second transducers. The correction factor preferably at least partially corrects for the non-linearity of the transducers, as further described below.

Figure 9B:
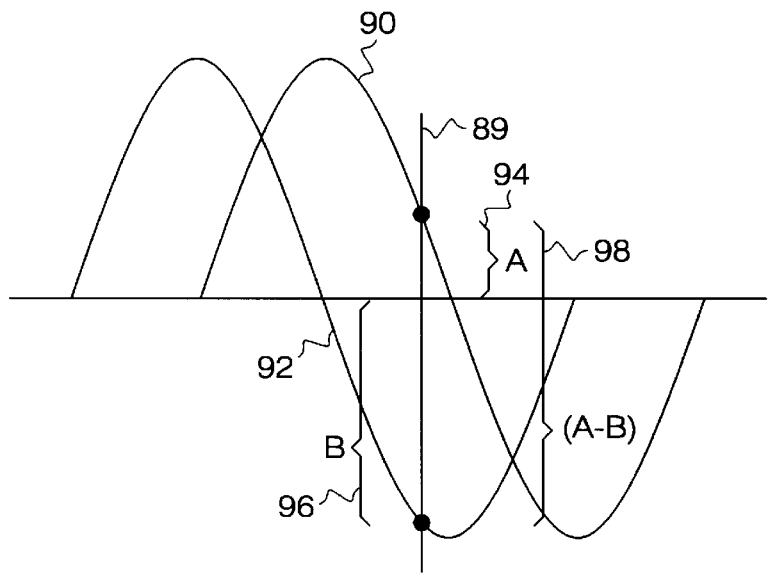
FIG. 9B shows illustrative output signals from two neighboring transducers of FIG. 7, each having an increased amplitude relative to that shown in FIG. 9A.

The ratio may be defined as A/(A−B). By including the term (A−B) in the denominator, common mode gain variations may be reduced. For example, and as shown in FIG. 9B, the common mode gain may increase, which increases the amplitude of the output signal value "A" 94 of the first transducer and decrease the amplitude of the output signal value "B" 96 of the second transducer. Thus, an increased common mode gain increases the value of "A" and increase the value of (A−B). Accordingly, the ratio A/(A−B) may be less sensitive to common mode gain than a simple ratio of A/B.

Figure 9C:
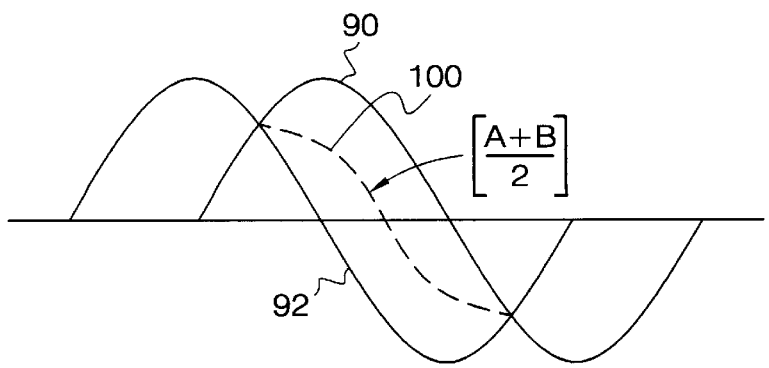
FIG. 9C shows illustrative output signals from two neighboring transducers of FIG. 7, and an average thereof.

Alternatively, the ratio may be defined as [(A+B)/2]/(A−B). By including the term [(A+B)/2] in the numerator, differential variations in the gain or sensor offset are averaged and thus potentially reduced, and common mode sensor offset variations are nulled. The quantity [(A+B)/2] is shown at 100 in FIG. 9C. Although this example only includes two sensor signals A and B, it is contemplated that more than two sensor output signals may be used in this algorithm (e.g. A, B, C, D, . . . ).

Figure 10:
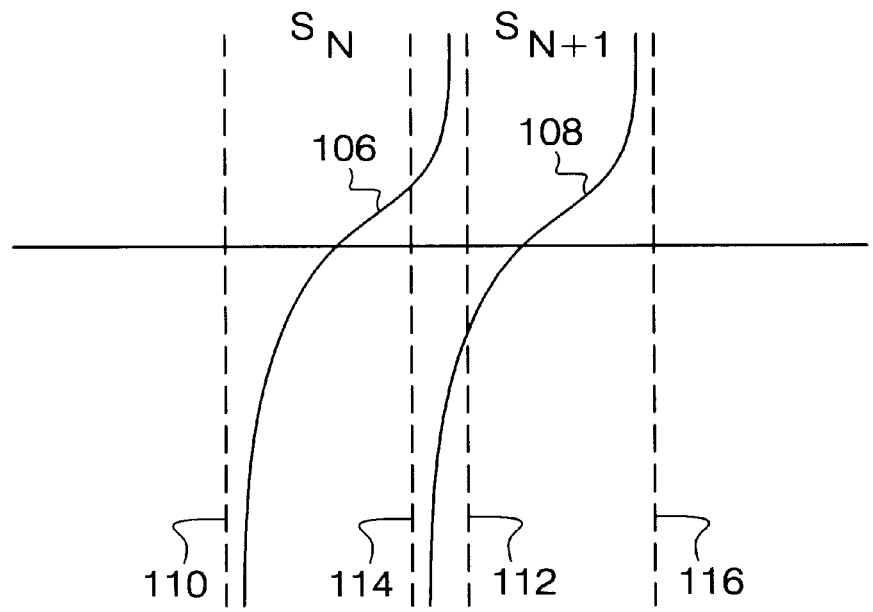
FIG. 10 shows a ratio $A/(A-B)$ for two neighboring transducer pairs.

FIG. 10 shows the ratio A/(A−B) for two neighboring transducer pairs. The ratio A/(A−B) for a first one of the transducer pairs is shown at 106, and the ratio A/(A−B) for a second one of the transducer pairs is shown at 108. Both ratios are shown as tangent shaped functions because when A equals B, such as shown at points 102 and 104 in FIG. 9A, the ratios approach infinity. Each of the tangent functions has two non-linear regions with a relatively linear region extending therebetween. The non-linear regions correspond to the non-linear regions of the corresponding transducers. Likewise, the linear region corresponds to the linear region of the corresponding transducers.

Preferably, the transducers are spaced such that the tangent functions overlap one another, at least to some degree. For example, the tangent function 106 extends from vertical lines 110 to 112, and the tangent function 108 extends from vertical lines 114 to 116. The overlap between the tangent functions is between vertical lines 112 and 116. The overlap allows the microprocessor 84 (see FIG. 7) to switch from one transducer pair to another when the ratios exceed some maximum value. However, the transducers are allowed to be sufficiently spaced apart so that at least part of the non-linear regions of selected transducers are used during the position determination of the magnet 12.

To identify the overall position of the magnet relative to the predefined path, it is contemplated that a number of offset values may be provided. A different offset value is preferably added to the ratio provided by each transducer pair. For example, if there are six transducers spaced along a predefined path of length L, there are five transducer pairs, and the offset value may be C*(L/5)*n, where C is a constant and n identifies the transducer pair position (1 . . . 5). Thus, depending on the position of the magnet relative to the five transducer pairs, the appropriate offset value is selected and applied. The offset preferably provides a uniformly increasing or decreasing output signal that is related to the position of the magnet along the predefined path.

Figure 11:
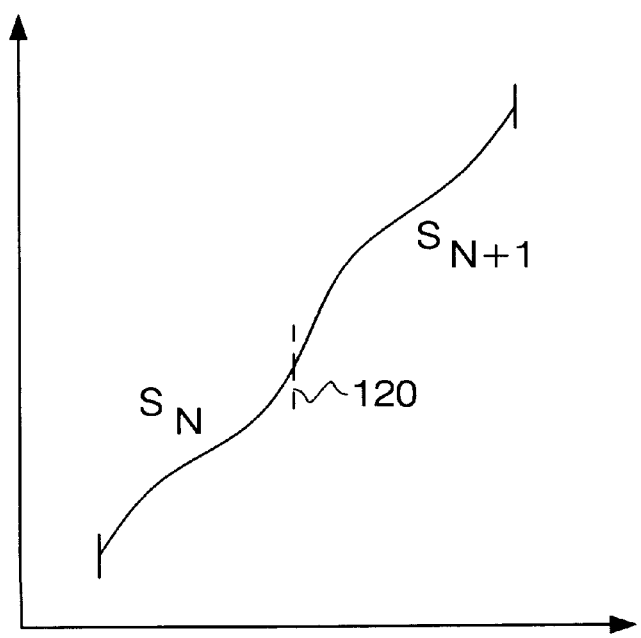
FIG. 11 shows a composite of the two ratios of FIG. 10, with a different offset applied to each.
Figure 12:
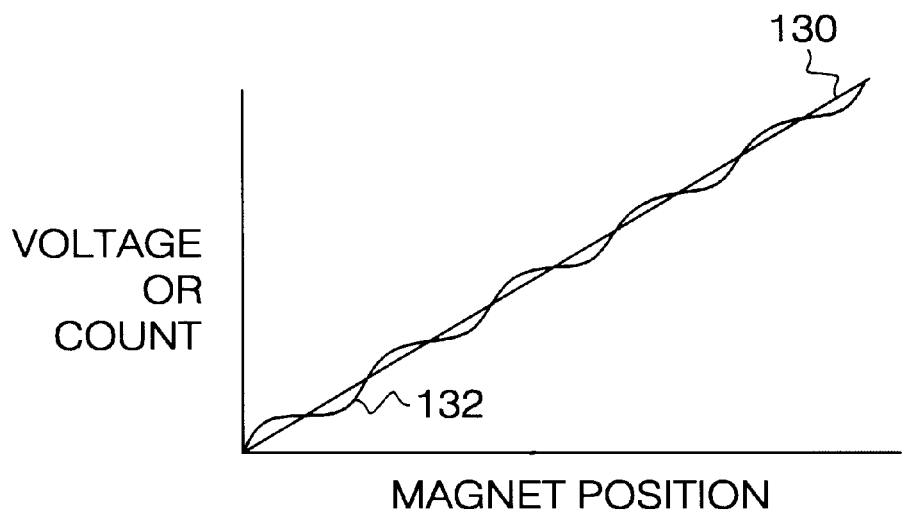
FIG. 12 shows a composite of the ratios of five transducer pairs.

FIG. 11 shows a composite of the two ratios of FIG. 10, with different offsets applied to each. The offsets are provided so that the lower end of ratio 108 of the second transducer pair aligns with the upper end of the ratio 106 of the first transducer pair. In the illustrative diagram, the microprocessor 84 switched from the first transducer pair to the second transducer pair at 120. FIG. 12 shows a composite of the ratios of five transducer pairs.

Because of the non-linear regions of most magnetic field transducers, the ratio provide by each transducer pair typically has a residual error therein. For most transducers, the residual error resembles a function such as a sinusoidal function, a nth order function (where n≧1), or some other function. Referring specifically to FIG. 12, an ideal position sensor output would be a straight line as shown at 130. However, because of the non-linearity in the transducers, the residual error causes the position sensor output to deviate therefrom, as shown at 132. In the illustrative embodiment, the residual error resembles a sinusoidal function, and is expressly shown at 136 in FIG. 13.

Figure 13:
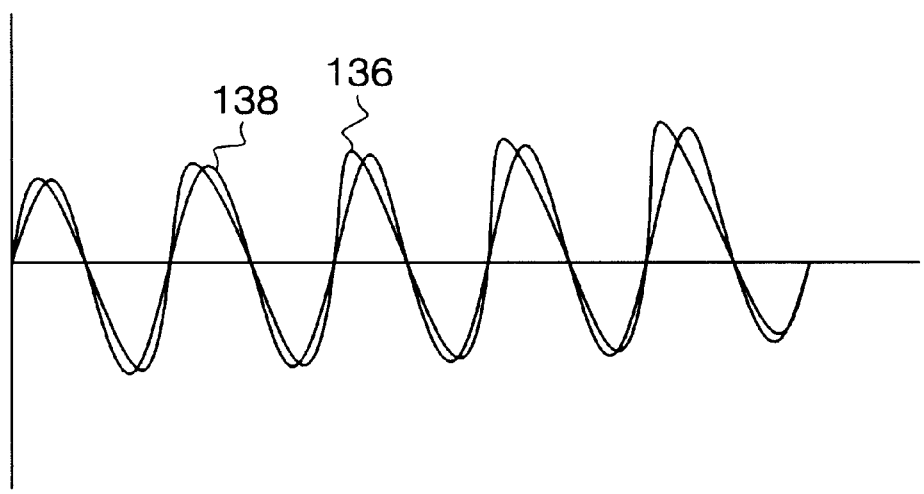
FIG. 13 shows an illustrative residual error of the composite signal of FIG. 12 overlayed with a sine approximation.

To compensate for the non-linearity in the transducers, it is contemplated that the residual error may be approximated using an appropriate function such as a sinusoidal function. Preferably, the appropriate function is determined during a calibration procedure. Referring specifically to FIG. 13, the residual error 136 can be approximated by a sinusoidal function 138. Once the appropriate function is identified, the residual error 136 may be removed from the ratio by simply adding or subtracting the appropriate value of the function to/from ratio.

Figure 14:
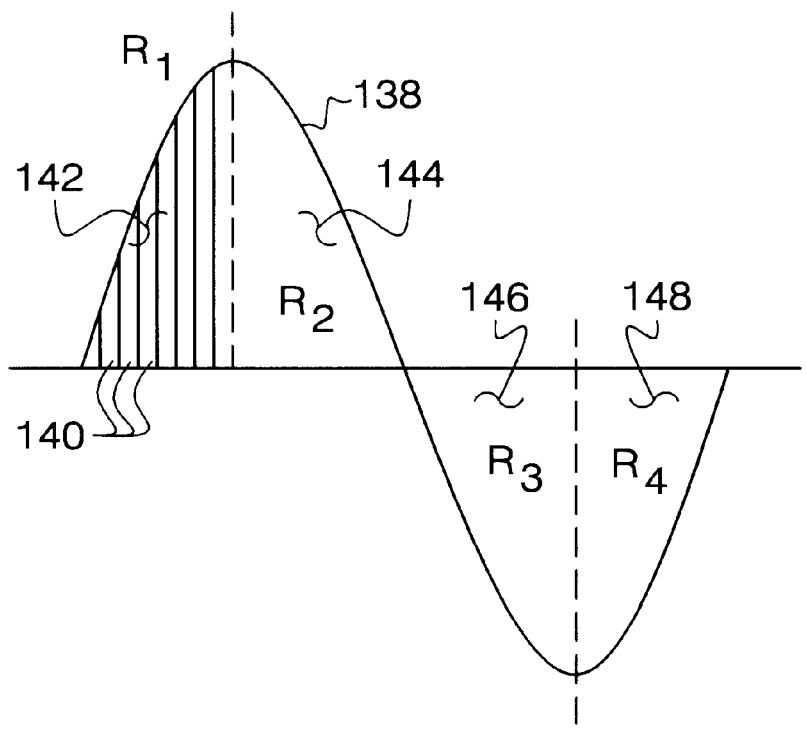
FIG. 14 shows a sinusoidal function that approximates the residual error shown in FIG. 13.

FIG. 14 shows a sinusoidal function that approximates the residual error 136 shown in FIG. 13. In a preferred embodiment, the function approximating the residual error is divided into a number of segments 140. A correction factor, which corresponds to the amplitude of the function at each segment, is assigned to each segments 140. Each of the correction factors are stored, preferably in a lookup table 150, as shown generally in FIG. 15. The value of the ratio may then be used to identify a corresponding correction factor from the look-up table 150. The selected correction factor can then be applied to the ratio, and the position of the magnet may be calculated therefrom. In this configuration, as the magnet is moved longitudinally relative to the first and second transducers, the desired ratio of signals A and B changes, and the corresponding correction factor changes, resulting in a continually updated position of the magnet.

To reduce the hardware required to implement the present invention, it is contemplated that the correction factors for only a portion of the sinusoidal function may be stored in the look-up table 150. In the illustrative embodiment, the correction factors corresponding to only one-fourth of the sinusoidal function 138 are stored in the look-up table 150. This can be done because the sinusoidal function 138 has four equally shaped regions 142, 144, 146 and 148. In the illustrative embodiment, the first region 142 is divided into 128 intervals, and the look-up table stores 128 corresponding correction factors. The look-up table may be EEPROM 86 of FIG. 7.

When applying the correction factors, the microprocessor 84 preferably determines which region of the sinusoidal function corresponds to the particular ratio value. Once this is determined, the ratio value is used to select an appropriate correction factor from the look-up table 150. For example, when moving the position of the magnet from left to right, the correction factors associated with the first region 142 are applied first, followed by the correction factors of the second region 144, the third region 146 and finally the fourth region 148. When moving through the first region 142, the microprocessor 84 preferably accesses the look-up table in ascending order as the ratio increases, and subtracts the corresponding correction factors from the ratio accordingly. When moving through the second region 144, the microprocessor 84 preferably accesses the look-up table in descending order as the ratio increases, and subtracts the corresponding correction factors from the ratio. When moving through the third region 146, the microprocessor 84 preferably accesses the look-up table in ascending order as the ratio increases, and adds the corresponding correction factors to the ratio. Finally, when moving through the fourth region 148, the microprocessor 84 preferably accesses the look-up table in descending order as the ratio increases, and adds the corresponding correction factors to the ratio.

Figure 15:
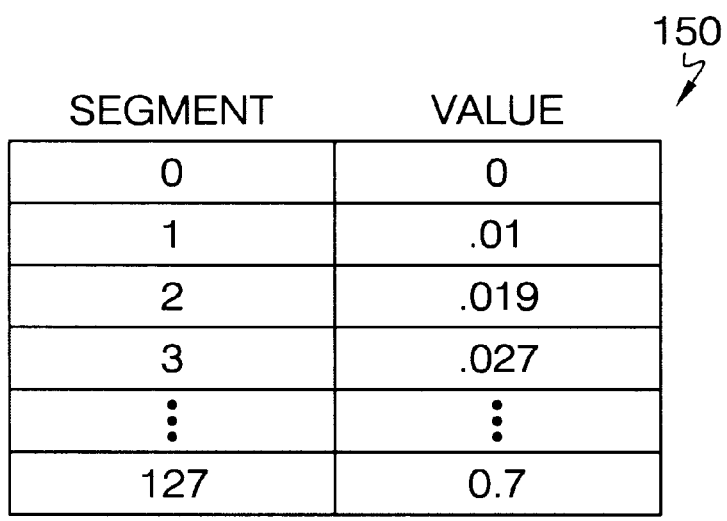
FIG. 15 shows a look-up table for storing a number of correction factors corresponding to the sinusoidal function of FIG. 14.
Figure 16:
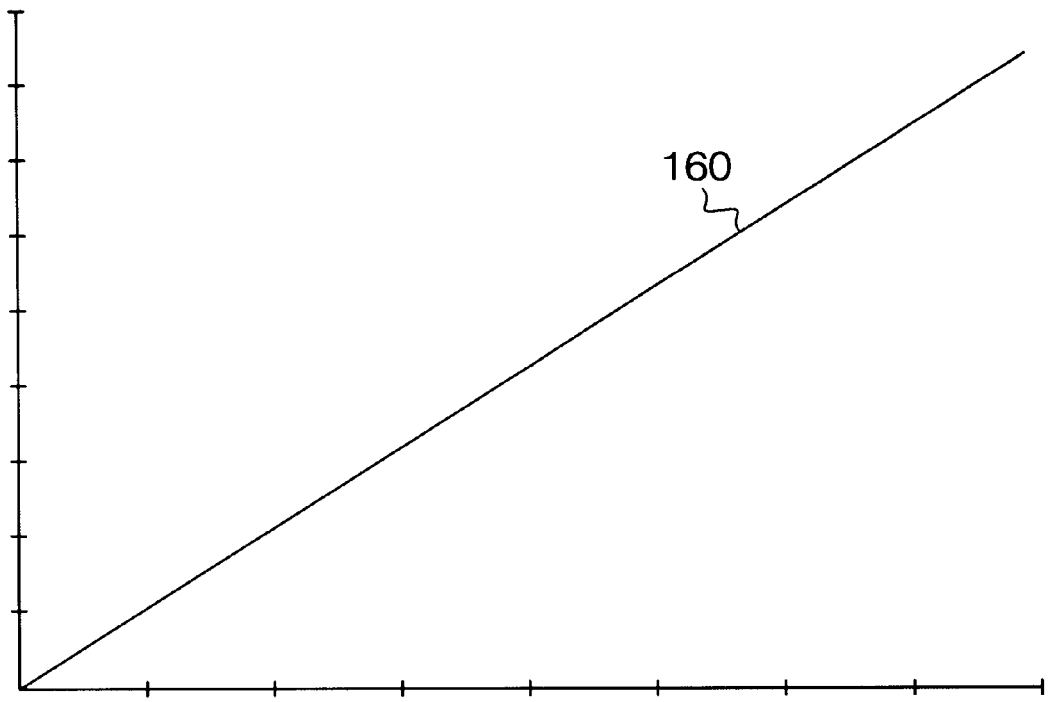
FIG. 16 shows a composite of the output signals of five of the transducers of FIG. 12 after the correction factors of FIG. 15 have been applied thereto.

FIG. 16 shows a composite of the output signals of FIG. 12, after the correction factors of FIG. 15 have been applied. As can be readily seen, the output of the position sensor is substantially improved over that shown in FIG. 12.

It is contemplated that the present invention may be implemented using analog logic, digital logic or preferably a combination thereof. Referring back to FIG. 7, the transducers 22 preferably provide analog output signals. The analog-to-digital converter 82 preferably converts the analog output signal values of each of the transducers 22 into a corresponding count value. The microprocessor 84 determines the position of the magnet by calculating an approximate position count from the count values of selected transducers. The approximate position count corresponds to the ratio described above. The microprocessor 84 also preferably applies a selected correction count to the approximate position count to determine the position of the magnet 12.

The approximate position count is preferably calculated by performing an extrapolation between the count values of the selected transducer pair. For example, the microprocessor 84 may calculate the approximate position count by selecting a first transducer that has a count value "A" that is in a first range, and a second transducer that has a count value "B" that is in a second range, and then calculating a ratio using A and B, wherein the ratio corresponds to the approximate position count.

It is also contemplated that a number of offset count values may be provided, wherein each of the offset count values corresponding to one of a number of intervals along the defined path. The microprocessor 84 may then add a selected one of the number of offset count values to the approximate position count. Preferably, the selected offset count value corresponds to the selected transducer pair.

Figure 17:
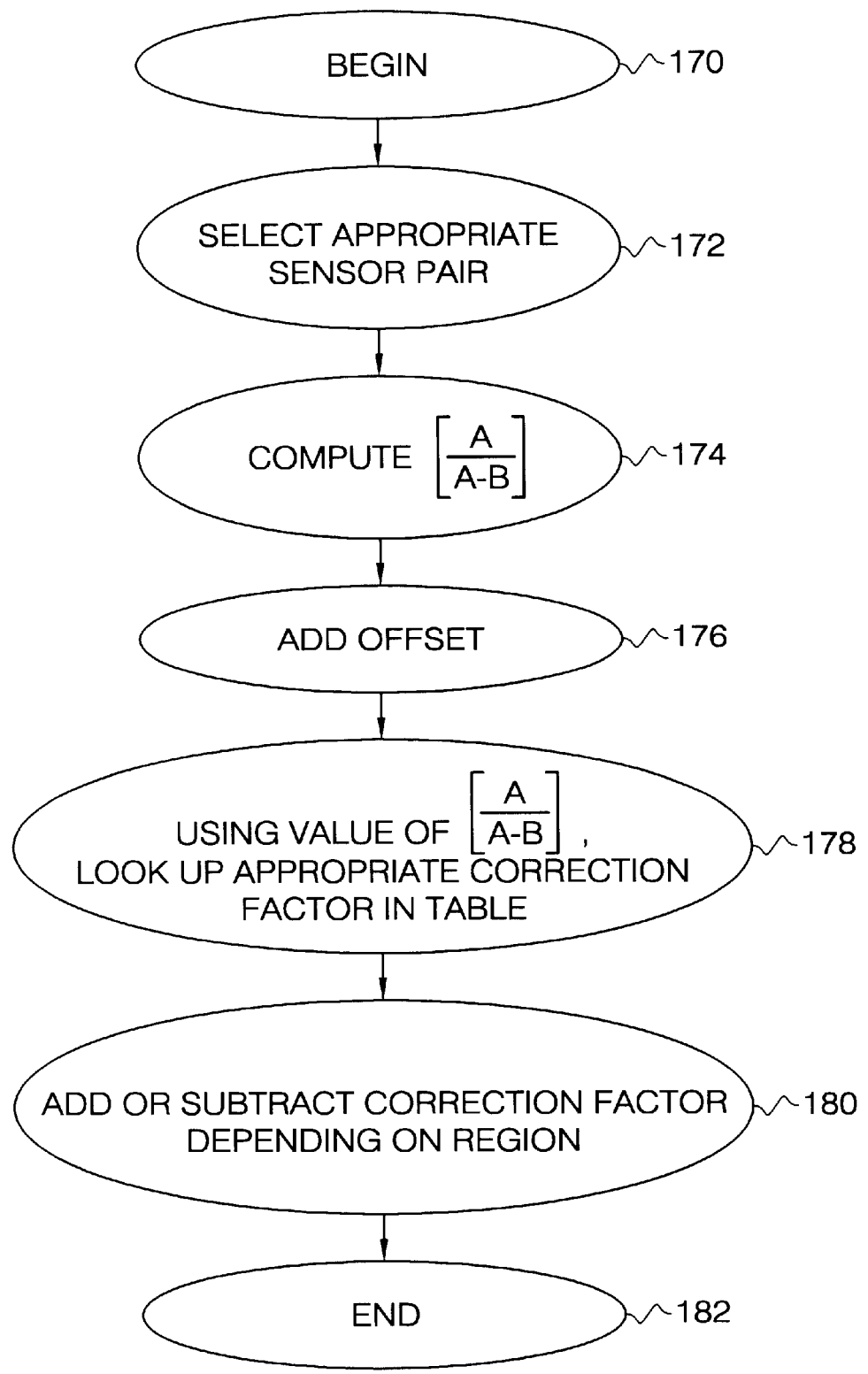
FIG. 17 is a flow diagram showing an illustrative method of the present invention.

Referring now to FIG. 17, a flow diagram is shown of an illustrative method in accordance with the present invention. The algorithm is entered at step 170, wherein control is passed to step 172. Step 172 selects a pair of transducers that have output signals that indicate relative proximity to the magnet. Control is then passed to step 174. Step 174 computes a ratio of the output signals A and B of the selected pair of transducers. The ratio is preferably computed as A/(A−B) or [(A+B)/2]/[(A−B)]. Control is then passed to step 176. Step 176 adds an appropriate offset depending on the selected transducer pair. Control is then passed to step 178. Step 178 uses the ratio to look-up an appropriate correction factor from a look-up table. Control is then passed to step 180. Step 180 adds or subtracts the corresponding correction factor to/from the ratio, depending on the region that that ratio resides. Control is then passed to step 182, wherein the algorithm is exited.

Having thus described the preferred embodiments of the present invention, those of skill in the art will readily appreciate that the teachings found herein may be applied to yet other embodiments within the scope of the claims attached hereto.

What is claimed is:

1. Apparatus for determining a position of a member movable along a defined path, comprising:

field producing means attached to the member for producing a magnetic field;

an array of magnetic field transducers located adjacent the defined path at known locations, each transducer providing a bipolar output signal as the field producing means approaches, passes and moves away from each transducer;

each of the transducers providing an output signal value for a first position of the field producing means; and determining means for determining the first position of the field producing means by calculating a ratio of the output signal values of selected transducers, and applying a selected correction factor to the ratio to determine the first position.

2. Apparatus according to claim 1 wherein the bipolar output signal of each transducer has a non-linear region.

3. Apparatus according to claim 2 wherein the correction factor at least partially corrects for a portion of the non-linear region.

4. Apparatus according to claim 1 wherein the selected correction factor is selected from a number of correction factors.

5. Apparatus according to claim 4 wherein the number of correction factors collectively correspond to a predetermined function.

6. Apparatus according to claim 5 wherein the predetermined function is a sinusoidal function.

7. Apparatus according to claim 5 wherein the predetermined function is an nth order function, wherein n is greater than or equal to one.

8. Apparatus according to claim 4 wherein the determining means calculates the ratio by selecting a first transducer that has a positive output signal value "A" and a second transducer that has a negative output signal value "B", and calculating A/(A−B), wherein the ratio is related to the position of the field producing means relative to the first and second transducers.

9. Apparatus according to claim 8 wherein the determining means further comprises a look-up table for storing the number of correction factors, and wherein the ratio is used to selected one of the number of correction factors from the look-up table.

10. Apparatus according to claim 4 wherein the determining means calculates the ratio by selecting a first transducer that has a positive output signal value "A" and a second transducer that has a negative output signal value "B", and calculating [(A+B)/2]/(A−B), wherein the ratio is related to the position of the field producing means relative to the first and second transducers.

11. Apparatus for determining a position of a member movable along a defined path, comprising:

field producing means attached to the member for producing a magnetic field;

an array of magnetic field transducers located adjacent the defined path at known locations, each transducer providing a bipolar output signal as the field producing means approaches, passes and moves away from each transducer;

each of the transducers providing an analog output signal value for a first position of the field producing means;

converting means for converting the analog output signal value of each of the transducers into a count value; and determining means for determining the first position of the field producing means by calculating an approximate position count from the count values of selected transducers, and applying a selected correction count to the approximate position count to determine a final count corresponding to the first position.

12. Apparatus according to claim 11 wherein the determining means calculates the approximate position count by performing an extrapolation between the count values of the selected transducers.

13. Apparatus according to claim 12 wherein the determining means calculates the approximate position count by selecting a first transducer that has a count value "A" that is in a first range, and a second transducer that has a count value "B" that is in a second range, and calculates a ratio using A and B, wherein the ratio corresponds to the approximate position count.

14. Apparatus according to claim 11 wherein a number of offset count values are provided, each of the offset count values corresponding to one of a number of intervals along the defined path.

15. Apparatus according to claim 14 wherein the determining means adds a selected one of the number of offset count values to the approximate position count, wherein the selected offset count value corresponds to the first and second transducer pair.

16. Apparatus according to claim 15 wherein a number of correction count values are provided, each of the correction count values corresponding to a particular approximate position count value.

17. Apparatus according to claim 16 wherein the determining means selects the one of the number of correction count values that corresponds to the approximate position count value.

18. Apparatus according to claim 17 wherein the determining means adds the selected one of the correction count values to the approximate position count, resulting in a final count value that represents the first position of the field producing means.

19. Apparatus according to claim 18 wherein the determining means comprises a processor.

20. Apparatus according to claim 19 wherein the number of correction count values are stored in a look-up table memory coupled to the processor.

21. A method for determining a position of a member movable along a defined path, comprising the steps of:
    providing field producing means attached to the member for producing a magnetic field;
    providing an array of magnetic field transducers located adjacent the defined path at known locations, each transducer providing a bipolar output signal as the field producing means approaches, passes and moves away from each transducer;
    each of the transducers providing an output signal value for a first position of the field producing means;
    calculating a ratio using the output signal values of selected transducers; and
    applying a selected correction factor to the ratio to determine the first position.

22. A method according to claim 21 further comprising the step of selecting the selected correction factor from a number of correction factors.

23. A method according to claim 22 wherein the number of correction factors collectively fall along a predetermined function.

24. A method according to claim 23 wherein the predetermined function is a sinusoidal function.

25. A method according to claim 23 wherein the predetermined function is an nth order function, where n is greater than or equal to one.

26. A method according to claim 22 wherein the calculating step calculates the ratio by selecting a first transducer that has a positive output signal value "A" and a second transducer that has a negative output signal value "B", and calculating a ratio using A and B, wherein the ratio is related to the position of the field producing means relative to the first and second transducers.

27. A method according to claim 26 wherein the ratio is defined as $A/(A-B)$.

28. A method according to claim 26 wherein the ratio is defined as $[(A+B)/2]/(A-B)$.

29. A method according to claim 26 further comprising selecting one of the number of correction factors from a look-up table.

30. Apparatus for determining a position of a member movable along a defined path, comprising:
    a magnet positioned circumferentially around at least part of an outside surface of the member;
    an array of magnetic field transducers located adjacent the defined path at known locations, each transducer providing a bipolar output signal as the magnet approaches, passes and moves away from each transducer;
    each of the transducers providing an output signal value for a first position of the field producing means; and
    determining means for determining the first position of the field producing by calculating a ratio of the output signal values of selected transducers, and applying a selected correction factor to the ratio to determine the first position.

31. Apparatus according to claim 30 wherein the magnet has a bore extending therethrough, wherein the bore receives at least part of the member.

32. Apparatus according to claim 31 wherein the bipolar output signal of each transducer has a non-linear region.

33. Apparatus according to claim 32 wherein the correction factor at least partially corrects for a portion of the non-linear region.

34. Apparatus according to claim 33 wherein the selected correction factor is selected from a number of correction factors.

35. Apparatus according to claim 34 wherein the determining means calculates the ratio by selecting a first transducer that has a positive output signal value "A" and a second transducer that has a negative output signal value "B", and calculating $A/(A-B)$, wherein the ratio is related to the position of the field producing means relative to the first and second transducers.

36. Apparatus according to claim 35 wherein the determining means further comprises a look-up table for storing the number of correction factors, and wherein the ratio is used to selected one of the number of corrections factors from the look-up table.

* * * * *

UNITED STATES PATENT AND TRADEMARK OFFICE
CERTIFICATE OF CORRECTION

PATENT NO.   : 6,097,183
DATED        : August 1, 2000
INVENTOR(S)  : Jay R. Goetz, Michael L. Rhodes, Phillip J. Zumsteg It is certified that error appears in the above-identified patent and that said Letters Patent is hereby corrected as shown below:

Title Page,
Please add inventor Philip J. Zumsteg, Richfield, Minnesota

Column 12,
Line 23, cancel "field producing means" and substitute -- magnet --.
Line 25, cancel "field producing" and substitute -- magnet --.
Line 32, cancel "bipolar".
Line 45, cancel "field producing means" and substitute -- magnet --.

Signed and Sealed this

Twenty-first Day of August, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

| | |
|---|---|
| PATENT NO. | : 6,097,183 |
| DATED | : August 1, 2000 |
| INVENTOR(S) | : Jay R. Goetz |

It is certified that error appears in the above-identified patent and that said Letters Patent is hereby corrected as shown below:

Title page,
Item [75] Inventors, should read as follows:
-- [75] Inventors: Jay R. Goetz, Deephaven; Michael L. Rhodes, Richfield;
  Philip J. Zumsteg, Shorewood, all of Minn. --.

Signed and Sealed this

Eleventh Day of December, 2001

Attest:

*Nicholas P. Godici*

NICHOLAS P. GODICI
*Attesting Officer*    *Acting Director of the United States Patent and Trademark Office*